Figure 1:
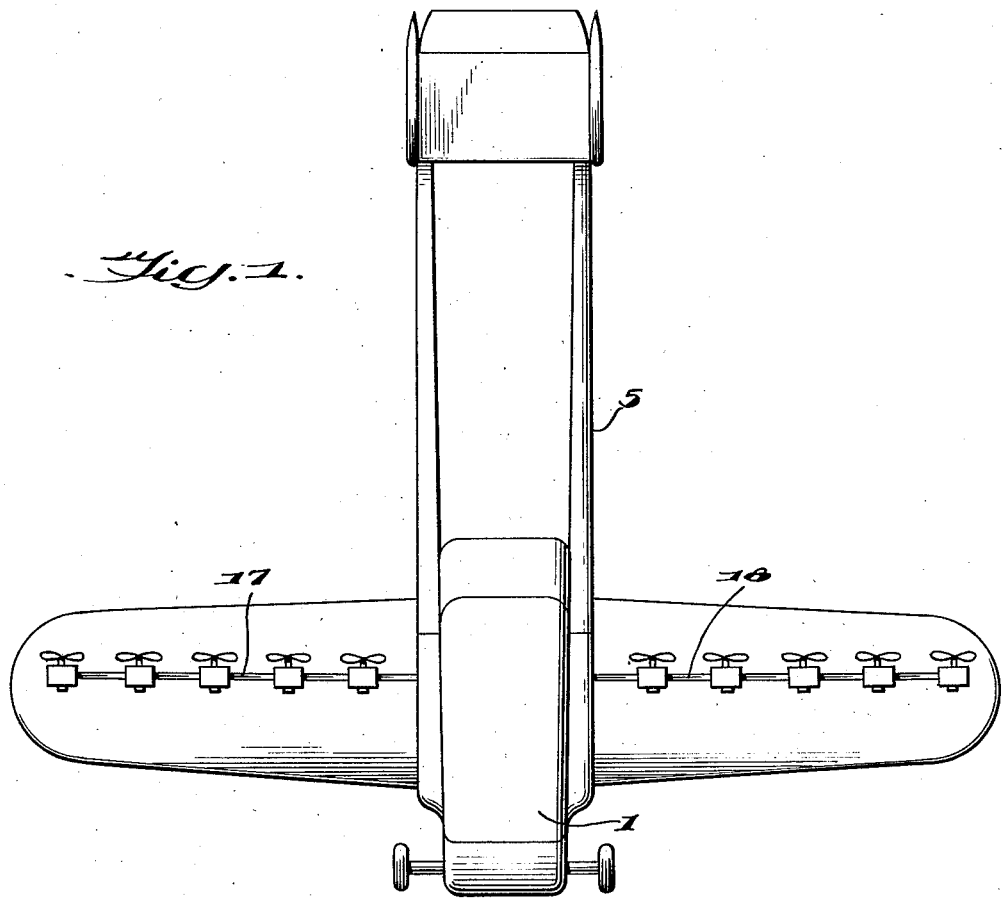
Figure 2:
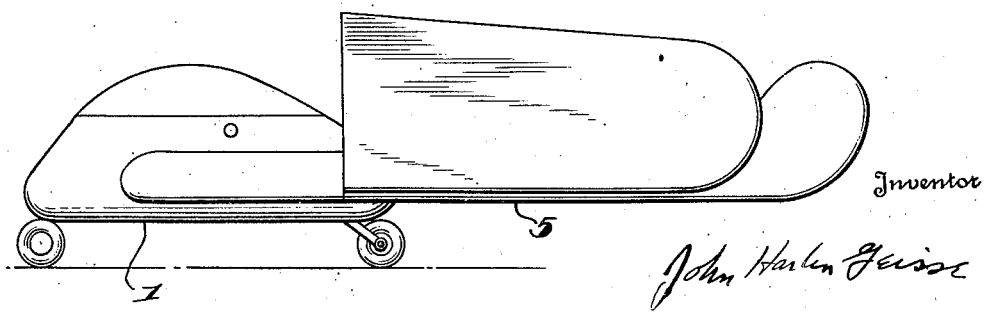

Jan. 6, 1948.   J. H. GEISSE   2,434,068
ROADABLE AIRPLANE WITH FOLDING AND DETACHABLE WINGS
Filed Oct. 5, 1944   2 Sheets-Sheet 1

Inventor
John Harlen Geisse

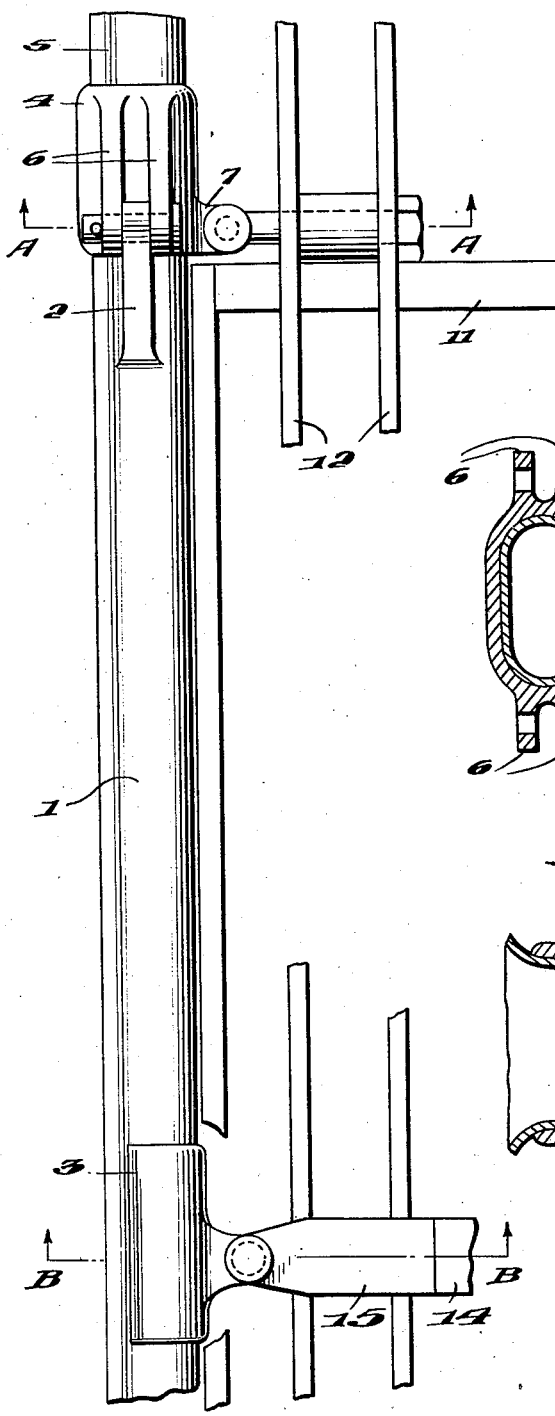

Patented Jan. 6, 1948

2,434,068

UNITED STATES PATENT OFFICE 2,434,068

ROADABLE AIRPLANE WITH FOLDING AND DETACHABLE WINGS

John Harlin Geisse, Madison, Wis.

Application October 5, 1944, Serial No. 557,335

2 Claims. (Cl. 244—2)

My invention relates to airplane design and has for its object the provision of a simple construction which will permit the operator to use it either as a roadable airplane or a flying automobile. As used herein, the term flying automobile denotes an airplane which can shed its wings and tail surfaces for the purpose of using the body or fuselage as an automobile. The term roadable airplane denotes an airplane whose wings can be folded in such a way that the airplane may then be operated on the highway. Both types have been proposed heretofore and each has its advantages and disadvantages. My invention retains the advantage of both and eliminates their disadvantages.

I attain the object of my invention by providing a design in which the wings may be folded back over the tail booms and when in this position permit the airplane to be operated on the highway. However, if the operator elects to do so, provision is made whereby after folding the wings back over the tail booms, the wings and tail assembly can be readily removed as a unit.

One form of the invention is illustrated in the accompanying drawings, in which Figure I is a plan view of the entire airplane; Figure II is a side view with the wings folded; Figure III is a detail showing the method of attachment of the wings and tail booms; Figure IV is a section taken on the line AA of Figure III; and Figure V is a section taken on the line BB of Figure III.

In Figure III, 1 is the body to which are rigidly attached mounting brackets 2 and 3, 2 being mounted in the rear and 3 in the front.

Removably fastened to bracket 2 is the dual purpose bracket 4 which is in turn rigidly attached to the boom 5. Bracket 4 has in addition to the ears 6 for attachment to bracket 2, ears 7 for holding the rear part of the wing. Rotatably attached to bracket 4 through the ears 7 is part 8. The shank 9 of part 8 is in turn rotatably mounted in the bearing 10 which is rigidly attached to the rear spar 11 between the wing ribs 12.

Removably attached to bracket 3 by means of pin 13 is the front spar 14 of the wing which is equipped with reinforcing plates 15.

From the above description it will be apparent that when pin 13 is removed the wing can be rotated back around pin 16 sufficiently to clear bracket 3. It may then be rotated around the shank 9 and then again rotated around pin 16 until it can be fastened to the tail boom. After both wings have been rotated back along the booms the wings and the tail assembly can be removed as a unit by removing the pins fastening bracket 4 to mounting bracket 2.

In Figure I, 17 and 18 are power shafts driven by an engine mounted within the body. These shafts transmit the power to the 5 propellers mounted on and above each wing. This arrangement of propellers is used not only to facilitate conversion for highway use but also to accomplish the purposes set forth in my pending application for a patent on this propeller arrangement.

The method of transmitting the power from the engine to one or more of the wheels is not germane to this application and hence no details are shown although such a drive would be included.

What I claim is:

1. In combination in an airplane, a body, a tail assembly, means detachably connecting said tail assembly to said body, wings, means detachably connecting each of said wings to said body and other means pivotally mounting each of said wings on said tail assembly.

2. In combination in an airplane, a body, tail surfaces, two booms supporting said tail surfaces, means detachably connecting said booms to said body, wings, means detachably connecting each of said wings to said body and other means pivotally mounting each of said wings on said booms.

JOHN HARLIN GEISSE.

REFERENCES CITED

The following references are of record in the file of this patent:

UNITED STATES PATENTS

| Number | Name | Date |
|---|---|---|
| 2,215,003 | Johnson | Sept. 17, 1940 |
| 2,368,288 | Couse et al. | Jan. 30, 1945 |
| 1,757,109 | Boyd | May 6, 1930 |
| 2,156,288 | Holliday | May 2, 1939 |
| 2,241,577 | Beals | May 13, 1941 |

FOREIGN PATENTS

| Number | Country | Date |
|---|---|---|
| 275,720 | Great Britain | Aug. 11, 1927 |